(12) United States Patent
Naito et al.

(10) Patent No.: US 11,494,580 B2
(45) Date of Patent: Nov. 8, 2022

(54) SYMBOL READING DEVICE, SYMBOL READING METHOD, AND SYMBOL READING SYSTEM

(71) Applicant: TOSHIBA TEC KABUSHIKI KAISHA, Tokyo (JP)

(72) Inventors: Hidehiro Naito, Mishima Shizuoka (JP); Hitoshi Iizaka, Fuji Shizuoka (JP); Shinsuke Yajima, Mishima Shizuoka (JP); Atsushi Miyashima, Izunokuni Shizuoka (JP); Takuya Takasu, Shizuoka Shizuoka (JP); Takeshi Watanabe, Tagata Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 332 days.

(21) Appl. No.: 16/902,183

(22) Filed: Jun. 15, 2020

(65) Prior Publication Data

US 2021/0081702 A1 Mar. 18, 2021

(30) Foreign Application Priority Data

Sep. 18, 2019 (JP) .............................. JP2019-169377

(51) Int. Cl.
| | |
|---|---|
| *G06K 9/62* | (2022.01) |
| *G06F 1/3206* | (2019.01) |
| *G06F 1/3287* | (2019.01) |
| *G06V 10/10* | (2022.01) |
| *G06V 10/75* | (2022.01) |

(52) U.S. Cl.
CPC ......... *G06K 9/6201* (2013.01); *G06F 1/3206* (2013.01); *G06F 1/3287* (2013.01); *G06K 9/6288* (2013.01); *G06V 10/10* (2022.01); *G06V 10/759* (2022.01)

(58) Field of Classification Search
CPC .. G06K 9/6201; G06K 9/6288; G06K 7/0008; G06K 17/0025; G06F 1/3206; G06F 1/3287; G06V 10/10; G06V 10/759; B65G 1/04; B65G 1/00; B65G 23/04; G06Q 10/087
See application file for complete search history.

(56) References Cited

U.S. PATENT DOCUMENTS

| | | | |
|---|---|---|---|
| 5,679,941 | A | 10/1997 | Iizaka et al. |
| 2007/0001813 | A1 | 1/2007 | Maguire et al. |
| 2008/0136638 | A1 | 6/2008 | Deolaliker et al. |
| 2012/0119883 | A1 | 5/2012 | Bekritsky |

OTHER PUBLICATIONS

Extended European Search Report dated Dec. 16, 2020 in corresponding European Patent Application No. 20186656.3, 7 pages.

*Primary Examiner* — John B Strege
(74) *Attorney, Agent, or Firm* — Kim & Stewart LLP

(57) ABSTRACT

A symbol reading device includes a plurality of reading units and a processor. The reading units read symbols on articles conveyed along a conveyance path. The processor is configured to acquire symbol information from a plurality of articles and store the symbol information in association with each of the reading units that read the symbols on respective articles, then identify a reading unit that can be substituted by another reading unit based on the symbol information associated with the reading units. The identified reading unit in then placed into a power saving state.

16 Claims, 6 Drawing Sheets

FIG. 4

| READING UNIT | READING RESULT ||||||  NECESSITY 1 | NUMBER OF TIMES OF READING 1 | CONTRIBUTION 1 | RESULT 1 | NECESSITY 2 | CONTRIBUTION 2 | RESULT 2 |
|---|---|---|---|---|---|---|---|---|---|---|---|---|---|
| | ARTICLE a | ARTICLE b | ARTICLE c | ARTICLE d | ARTICLE e | ARTICLE f | | | | | | | |
| A | 49aa | | | | 49ee | | 0 | 2 | 0.42 | 1 | 0 | 0.42 | 1 |
| B | 49aa | 49bb | | | 49ee | | 0 | 3 | 0.36 | 1 | 0 | 0.36 | 1 |
| C | 49aa | 49bb | | | | 49ff | 0 | 3 | 0.31 | 1 | 0 | 0.31 | 1 |
| D | | 49bb | 49cc | | | | 0 | 3 | 0.25 | 1 | 0 | 0.29 | 0 |
| E | | 49bb | 49cc | | | 49ff | 0 | 3 | 0.28 | 1 | 0 | 0.31 | 1 |
| F | | | 49cc | | | 49ff | 0 | 2 | 0.29 | 1 | 0 | 0.33 | 1 |
| G | | | 49cc | | | | 0 | 1 | 0.25 | 0 | | | |
| H | | | | 49dd | | | 1 | 1 | | 1 | 1 | | 1 |

SYMBOL READING DEVICE, SYMBOL READING METHOD, AND SYMBOL READING SYSTEM

CROSS-REFERENCE TO RELATED APPLICATION

This application is based upon and claims the benefit of priority from Japanese Patent Application No. 2019-169377, filed Sep. 18, 2019, the entire contents of which are incorporated herein by reference.

FIELD

Embodiments described herein relate generally to a symbol reading device, a symbol reading method, and a symbol reading system.

BACKGROUND

In a commercial facility, such as a factory, a warehouse, or a retail store, a belt conveyor is widely used to convey products, items, articles, or commodities. For example, in a retail store, products to be purchased are conveyed along a belt conveyor, which is also sometimes referred to as a conveyor belt. In such a case, a symbol, such as a barcode or a two-dimensional code, is printed on, or attached to, the product (or the container or packaging thereof) to permit identification of the product. Such a symbol can be read by a reading device such as an optical scanner or a camera when the product is being conveyed by the belt conveyor.

To read such an identifying symbol on a product, the reading device generally needs to face the surface of the product (or its container) on which the symbol is displayed. However, it is often uncertain in which direction the surface having the symbol will be facing when the product is conveyed by the belt conveyor. Thus, to increase the chance of reading the symbol correctly, a plurality of reading devices are disposed around the belt conveyer so as to scan/view the product from various directions.

In such a case, however, all of the reading devices typically need to operate continuously to permit reading of the symbol, which may result in an increase of power consumption by the symbol reading device.

DESCRIPTION OF THE DRAWINGS

FIG. 4 is a diagram illustrating a structure of data stored in a reading information area.

DETAILED DESCRIPTION

One or more embodiments provide a symbol reading device, a symbol reading method, and a symbol reading system that make it possible to read a symbol using multiple reading units with low power consumption.

In general, according to an embodiment, a symbol reading device includes a plurality of reading units and a processor. The reading units are configured to read symbols on articles being conveyed along a conveyance path. The processor is configured to acquire symbol information by controlling the reading units to read symbols from each of a plurality of articles and store the symbol information in association with each of the reading units that respectively read the symbols on each of the articles. A first reading unit from the plurality is then identified based on the symbol information associated with each of the reading units. The first reading unit is a reading unit that can be substituted by another reading unit in the plurality of reading units. The processor is configured to control the first reading unit to enter into a power saving state.

A symbol reading device according to an embodiment is explained with reference to the drawings.

Figure 1:
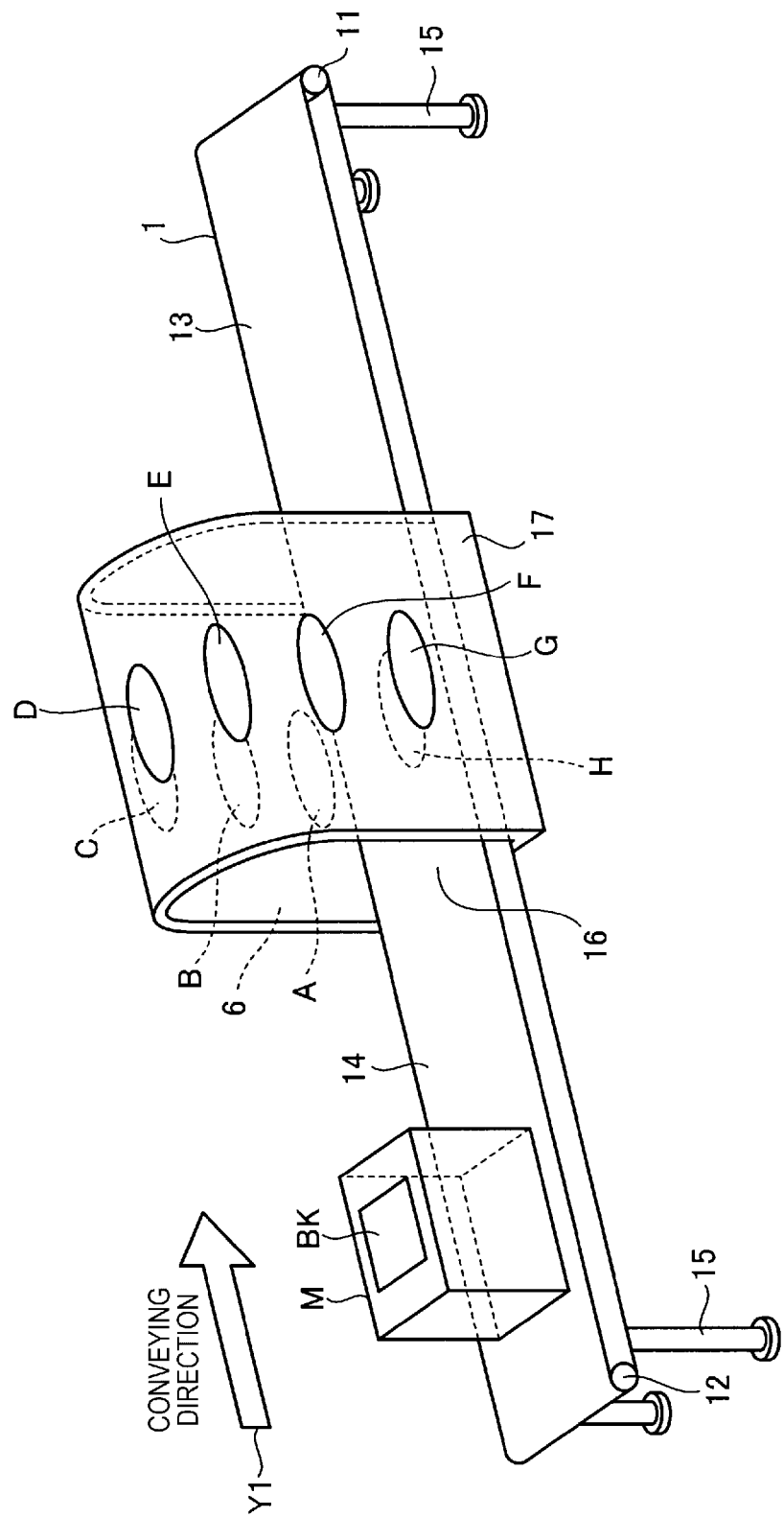
FIG. 1 is a perspective view illustrating a belt conveyor including a symbol reading device according to an embodiment.
Figure 2:
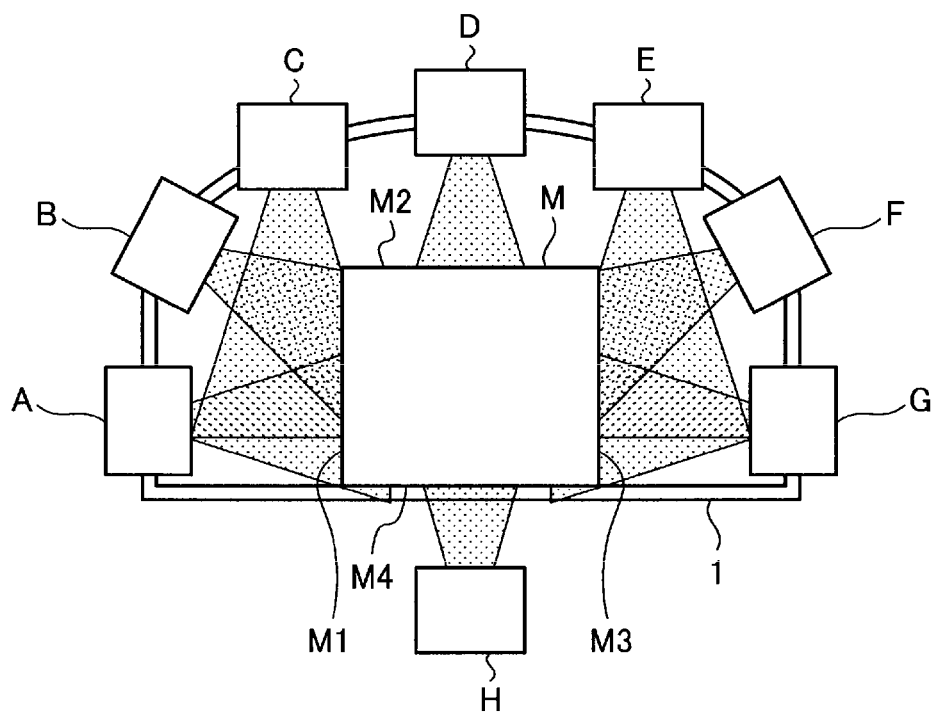
FIG. 2 is a diagram illustrating reading units arranged in a symbol reading device according to an embodiment.

First, a configuration of a belt conveyor 1 and a symbol reading device 6 is explained. For example, the belt conveyor 1 is used to convey articles in a warehouse. FIG. 1 is a perspective view illustrating the belt conveyor 1 and the symbol reading device 6 according to an embodiment. The belt conveyor 1 and the symbol reading device 6 can together make up a symbol reading system. FIG. 2 is a diagram illustrating reading units installed in the symbol reading device 6.

The belt conveyor 1 includes a conveying surface 14 on which an operator places an article M. The article M means an article itself or a container such as a box in which the article M is stored. A symbol BK, such as a barcode or a two-dimensional code, is attached to one or two or more surfaces of the article M. The symbol BK provides information for identifying the article M. The symbol BK is printed on the article M or a label or the like pasted on the article M.

The belt conveyor 1 includes a roller 11 and a roller 12. One or both of the roller 11 and the roller 12 are rotated by a not-illustrated power source. The belt conveyor 1 includes an endless conveyor belt 13 formed of rubber, cloth, caterpillar, or the like. The conveyor belt is laid over the roller 11 and the roller 12. The conveyor belt 13 includes the conveying surface 14 having a plane shape on the upper surface thereof. The operator places the article M on the conveying surface 14 of the conveyor belt 13. The conveyor belt 13 is rotated by a rotating roller and conveys the article M placed on the conveying surface 14 of the conveyor belt 13 in an arrow Y1 direction. The conveyor belt 13 includes legs 15. The legs 15 support the conveying surface 14 of the conveyor belt 13 above a floor surface. In the belt conveyor 1, the conveyor belt 13 conveys the article M along a conveyance path.

The symbol reading device 6 is located at a substantially center part 16 of the belt conveyor 1, which is a part of the conveyance path. The symbol reading device 6 includes a supporting unit 17 and a plurality of reading units. The symbol reading device 6 has the plurality of reading units supported by the supporting unit 17. The supporting unit 17 is formed in an arch shape to extend across the conveyor belt 13 from one side upward and to the other side of the conveyor belt 13. Accordingly, the plurality of reading units are arranged along the arch of the supporting unit 17. The symbol reading device 6 includes a control unit, a memory, and the like explained below with reference to FIG. 3.

In one embodiment, the symbol reading device 6 includes seven reading units A to G. The reading units A to G are, for example, devices that optically read the symbol BK attached to the article M. Alternatively, the reading units A to G are cameras that image and read the symbol BK attached to the article M. The reading unit A is disposed so as to face one side surface M1 orthogonal to a conveying direction of the conveyed article M. The reading unit A reads the symbol BK attached to the one side surface M1 of the article M. The reading unit D is disposed so as to face an upper surface M2 parallel to the conveying direction of the conveyed article M. The reading unit D reads the symbol BK attached to the upper surface M2 of the article M. The reading unit G is disposed so as to face the other side surface M3 on the opposite side of the one side surface M1 orthogonal to the conveying direction of the conveyed article M. The reading unit G reads the symbol BK attached to the other side surface M3 of the article M.

The reading unit B and the reading unit C are disposed between the reading unit A and the reading unit D. The reading unit B and the reading unit C read the symbols BK attached to the one side surface M1 and the upper surface M2 of the article M. The reading unit E and the reading unit F are disposed between the reading unit D and the reading unit G. The reading unit E and the reading unit F read the symbols BK attached to the upper surface M2 and the other side surface M3 of the article M.

The symbol reading device 6 includes a reading unit H. The reading unit H is a scanner that optically reads, for example, the symbol BK attached to the article M. Alternatively, the reading unit H is a camera that images and reads the symbol BK attached to the article M. The reading unit H is disposed so as to face a lower surface M4 parallel to the conveying direction of the conveyed article M. The reading unit H reads the symbol BK attached to the lower surface M4 of the article M. The conveyor belt 13 includes, for example, two conveyor belts spaced apart a gap from each other. The reading unit H reads, from below the conveyor belt 13, the symbol BK attached to the lower surface of the article M passing through the gap.

The reading units A to H can be switched to a full operation state in which electric power is consumed and a standby state in which power consumption is reduced more than in the full operation state. The full operation state is a state in which the reading units can read the symbols BK attached to the article M passing through the symbol reading device 6. If the reading units are in the full operation state, power consumption of the reading units is large. The standby state is a waiting state or a pause state of the reading units and is a state in which the reading units cannot read the symbols BK attached to the article M passing through the symbol reading device 6. If the reading units are in the standby state, power consumption of the reading units is small. The standby state may be an OFF state in which supply of electric power to the reading units is suspended. In other words, the standby state corresponds to the OFF state of the reading units.

Figure 3:
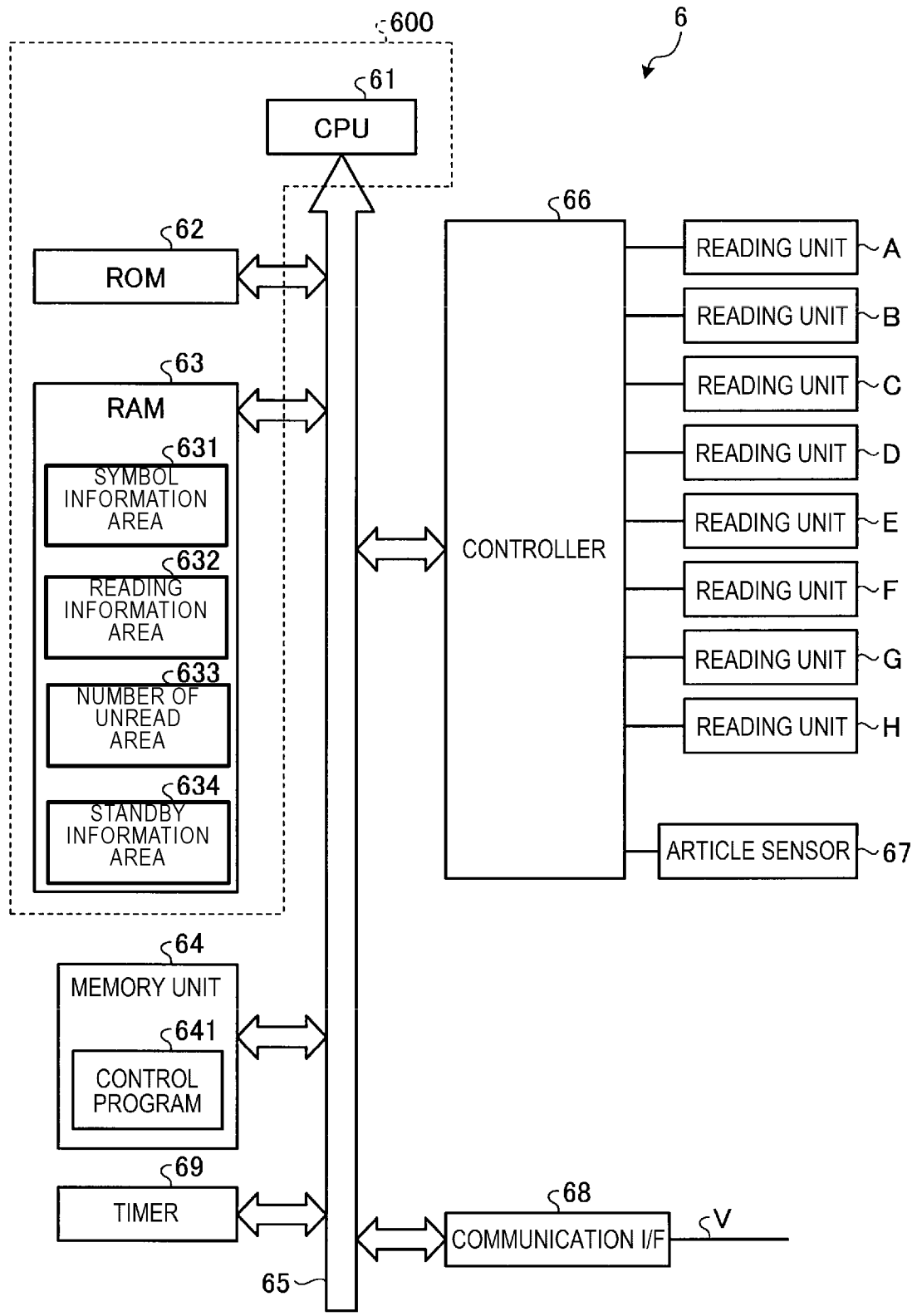
FIG. 3 is a hardware block diagram of a symbol reading device according to an embodiment.

Hardware of the symbol reading device 6 is explained. FIG. 3 is a hardware block diagram of the symbol reading device 6. As illustrated in FIG. 3, the symbol reading device 6 includes a CPU (Central Processing Unit) 61, a ROM (Read Only Memory) 62, a RAM (Random Access Memory) 63, and a storage unit 64. The CPU 61 performs various programs. The ROM 62 stores various programs. The programs and various data are loaded into the RAM 63. The storage unit 64 stores various programs. The CPU 61, the ROM 62, the RAM 63, and the storage unit 64 are connected to one another via a bus 65. The CPU 61, the ROM 62, and the RAM 63 make up a control unit 600. In other words, the CPU 61 operates according to a control program stored in the ROM 62 and the storage unit 64 and loaded in the RAM 63, whereby the control unit 600 executes control processing for the symbol reading device 6 explained below.

The RAM 63 includes a symbol information area 631, a reading information area 632, a number-of-failure-of-reading area 633, and a standby information area 634. The symbol information area 631 stores specifying information for specifying an article acquired from the symbols BK read by the reading units A to H. In other words, the symbol information area 631 stores specifying information of the article M conveyed by the conveyor belt 13 and passed through the symbol reading device 6. The reading information area 632 stores, for each of the reading units that read the symbols BK, specifying information acquired from the symbols BK read by the reading units A to H. The reading information area 632 is explained below with reference to FIG. 4. The number-of-failure-of-reading area 633 stores the number of failure of reading, which is the number that none of the reading units A to H successfully read the symbols BK attached to the article M, although the article M passes through the symbol reading device 6. The standby information area 634 stores information about the reading units switched to the standby state among the reading units A to H.

The storage unit 64 is an SSD (Solid State Drive), an HDD (Hard Disc Drive), a flash memory, or the like and maintains data even if power supply is interrupted. The storage unit 64 includes a control program area 641. The control program area 641 stores one or more control programs for controlling the symbol reading device 6.

The control unit 600 is connected to the reading units A to H, a controller 66, and an article sensor 67 via the bus 65. The controller 66 controls the reading units A to H to read the symbols BK. The controller 66 controls the article sensor 67. The article sensor 67 detects that the article M placed on the conveying surface 14 of the conveyor belt 13 is passing through the symbol reading device 6 (specifically, the inside of the arch-shaped supporting unit 17). In other words, if the article sensor 67 detects the article M, the article M is passing through the symbol reading device 6. In other words, if none of the reading units has successfully read the symbols BK attached to the article M, although the article sensor 67 has detected the article M, it can be considered that the symbol reading device 6 has not successfully read the symbol BK.

The control unit 600 is connected to the communication unit 68 via the bus 65. The communication unit 68 is connected to other devices via a connection line V and is capable of transmitting and receiving information to and from the other devices. The control unit 600 is connected to a timer 69 via the bus 65. The timer 69 measures time.

The reading information area 632 is explained. FIG. 4 is a diagram illustrating a structure of data stored in the reading information area 632. As illustrated in FIG. 4, the reading information area 632 includes a reading area 6321, a reading result area 6322, a first determining area 6323, and a second determining area 6324.

The reading area 6321 stores information for specifying the particular reading units A to H.

The reading result area 6322 stores a reading result for each article M (e.g., one of articles "a" to "f") passed through the symbol reading device 6 indicating which, if any, of the reading units A to H have read a symbol BK for the particular article M during a reading attempt. In the example illustrated in FIG. 4, six articles M including an article "a", an article "b", an article "c", an article "d", an article "e", and an article "f" have passed through the symbol reading device 6. Any number of articles M can be detected by the symbol reading device 6.

In the example illustrated in FIG. 4, the article "a" has been passed through the symbol reading device 6. The value "49aa" is stored in the fields of article "a" of the reading result area 6322 for the reading unit A, the reading unit B, and the reading unit C. Such a value is not stored in the fields for the reading units D to H. In other words, the reading unit A, the reading unit B, and the reading unit C have read the symbol(s) BK attached to the article a. The reading units D to H have not read symbol(s) BK. The value "49aa" corresponds to the information for specifying the article "a".

In the case of the article "b", the value "49bb" is stored in the fields of article "b" of the reading result area 6322 for the reading unit B, the reading unit C, the reading unit D, and the reading unit E. Such a value is not stored in the fields for the reading unit A and the reading units F to H. In other words, the reading unit B, the reading unit C, the reading unit D, and the reading unit E have read the symbol(s) BK attached to the article "b". The reading unit A and the reading units F to H have not read the symbol(s) BK. The value "49bb" corresponds to information for specifying the article "b".

In the case of the article "c", the value "49cc" is stored in the fields of article "c" of the reading result area 6322 for the reading unit D, the reading unit E, the reading unit F, and the reading unit G. Such a value is not stored in the fields for the reading units A to C and the reading unit H. In other words, the reading unit D, the reading unit E, the reading unit F, and the reading unit G have read the symbol(s) BK attached to the article "c". The reading units A to C and the reading unit H have not read the symbol(s) BK. The value "49cc" corresponds to information for specifying the article "c".

In the case of the article "d", the value "49dd" is stored in the fields of article "d" of the reading result area 6322 for the reading unit H. Such a value is not stored in the fields for the reading units A to G. In other words, only the reading unit H has read a symbol BK attached to the article "d". The reading units A to G have not read the symbol(s) BK. The value "49dd" corresponds to information for specifying the article "d".

In the case of the article "e", the value "49ee" is stored in the fields of article "e" of the reading result area 6322 for the reading unit A and the reading unit B. Such a value is not stored in the fields for the reading units C to H. In other words, the reading unit A and the reading unit B have read the symbol(s) BK attached to the article "e". The reading units C to H have not read the symbol(s) BK. The value "49ee" corresponds to information for specifying the article "e".

In the case of the article "f", the value "49ff" is stored in the fields of article "f" of the reading result area 6322 for the reading unit C, the reading unit E, and the reading unit F. Such a value is not stored in the fields for the reading unit A, the reading unit B, the reading unit D, the reading unit G, and the reading unit H. In other words, the reading unit C, the reading unit E, and the reading unit F have read the symbol(s) BK attached to the article "f". The reading unit A, the reading unit B, the reading unit D, the reading unit G, and the reading unit H have not read the symbol(s) BK. The value "49ff" corresponds to information for specifying the article "f".

The first determining area 6323 stores first information used for selecting a reading unit to be switched to the standby state based on the information of the reading result area 6322. The first determining area 6323 includes a first necessity section 63231 (column "necessity 1"), a first number of readings section 63232 (column "number of times of reading 1"), a first contribution section 63233 (column "contribution 1"), and a first result section 63234 (column "result 1"). The first necessity section 63231 stores information indicating necessity (first time) of the reading units A to H determined by the control unit 600 based on a reading state of the symbols BK by the reading units A to H of the articles "a" to "f" that have passed through the symbol reading device 6. Necessity means whether the reading units A to H are necessary to read the symbols BK of the articles "a" to "f", for example. If the reading units A to H are always necessary to read the symbols BK of the articles "a" to "f", "1" is stored as the necessity. If the reading units A to H are not always necessary (can be substituted by other reading units, that is, the other reading units can also read the symbols BK) to read the symbols BK of the articles "a" to "f", "0" is stored as the necessity. For example, if the symbol BK is attached to the lower surface M4, only the reading unit H can read the symbol BK. In such a case, the reading unit H is always necessary, and thus the necessity of the reading unit H is "1".

The first number of readings section 63232 stores, for each of the reading units, the number of successful readings once all the articles "a" to "f" have been conveyed. For example, since the reading unit A has successfully read the symbols BK of the article "a" and the article "e", the value of two ("2") is stored in the first number of readings section 63232. Similarly, since the reading unit B has read the symbols BK of the article "a", the article "b", and the article "e", the value of three ("3") is stored.

The first contribution section 63233 stores a first calculated contribution value for the reading units A to G as calculated by the control unit 600 based on reading results of the articles "a" to "f" that have been passed through the symbol reading device 6. This contribution value corresponds to the degree to which each of the reading units is successful in reading the symbols BK of the articles "a" to "f." The reading unit H is excluded in this context. In other words, the calculated contribution value indicates the possibility of substitution/replacement of one reading unit by other reading units for reading the symbols BK of the articles "a" to "f". When there are more possible substitute reading units, the calculated contribution for a reading unit is lowered. When there are fewer substitute reading units, the calculated contribution value for a reading unit is increased.

The first contribution section 63233 stores contribution values for the reading units A to G, but excluding the reading unit H (since the first necessity value for reading unit H is equal to "1") for the reading of the articles "a" to "f". The control unit 600 calculates the contribution as explained below. For example, the reading unit A has read the symbols BK of the article "a" and the article "e". In addition to the reading unit A, the reading unit B and the reading unit C have also read the symbol BK of the article "a". Here, if summed contribution values in the reading of the article "a" by the reading unit A, the reading unit B, and the reading unit C is considered to be "1", the calculated contribution value in the reading of the article "a" by the reading unit A would be ⅓. Reading unit B and reading unit C would also have the same value.

Regarding the article "e", in addition to the reading unit A, the reading unit B has also read the symbol BK of the article "e". In such a case, if summed contribution values in the reading of the article "e" by both the reading unit A and the reading unit B is considered to be "1", the calculated contribution value in the reading of the article "e" by the reading unit A is ½.

As a result, since the reading unit A did not successfully read the symbol for any of the other articles M, the total contribution for the reading unit A is calculated as (⅓+½)/2 (which is equal to 0.42). That is, value for the first contribution section 63232 (the "contribution 1" column) is equal to the sum of individual contributions in the readings of each article "a" to "f" divided by the total number of successful readings by reading unit A in the reading attempts of the articles "a" to "f".

The reading unit B has read the symbols BK of the article "a", the article "b", the article "c", and the article "e". In addition to the reading unit B, the reading unit A and the reading unit C have also read the symbol BK of the article "a". Thus, if the summed contributions to the reading of the article "a" by the reading unit A, the reading unit B, and the reading unit C is assumed to equal a value of 1, the contribution to the reading of the article "a" by the reading unit B is considered to be equal to ⅓.

Regarding the article "b", in addition to the reading unit B, the reading unit C, the reading unit D, and the reading unit E have also read the symbol BK of the article "b". Thus, if the summed contribution to the reading of the article "b" by the reading unit B, the reading unit C, the reading unit D, and the reading unit E is equal to a value of 1, contribution to the reading of the article "b" by the reading unit B is considered to be ¼.

Regarding article "e", in addition to the reading unit B, the reading unit A has also read the symbol BK of the article "e". Thus, the contribution to the reading of the article "e" by the reading unit B is ½. The total contribution (the value in first contribution section 63232) for the reading unit B is calculated as (⅓+¼+½)/3 (which is equal to 0.36).

Similarly, the control unit 600 calculates contribution of the reading unit C (0.31), contribution of the reading unit D (0.25), contribution of the reading unit E (0.28), contribution of the reading unit F (0.29), and contribution of the reading unit G (0.25). These contributions values calculated by the control unit 600 are respectively stored in the first contribution section 63233.

Subsequently, the control unit 600 identifies, based on the calculated contributions for the reading units A to G, the one of reading units having the lowest contribution value. In the case of FIG. 4, the reading unit D and the reading unit G are tied for the lowest contribution (0.25). In such a case, the control unit 600 identifies which of these reading units have the fewest number of successful article M readings. In this case, reading unit G only read one article M (article C in particular) successfully, but reading unit D read two articles M (articles B and C, in particular) successfully. As a result, in the first result section 63234, "1" is stored for the reading unit H (because reading unit H has a first necessity value set to "1"), and also for the reading units A to F excepting reading unit G which is considered to have the lowest contribution value. Here, the value "1" in the first result section 63234 indicates that the reading unit can operate in the full operation state. On the other hand, the reading unit G having value of "0" in the first result section 63234 is switched to the standby state.

The second determining area 6324 stores, based on information of the reading result area 6322, second information also based on information from the reading result area 6322 for selecting a reading unit to be switched to the standby state. The second determining area 6324 stores necessity information in second necessity section 63241 ("necessity 2" column) and second contribution values that have been determined and calculated again, as explained below, in second contribution section 63242 ("contribution 2" column). In other words, the second determining area 6324 stores values which can be used to identify a reading unit from among reading units A to F having the lowest contribution after the reading unit G.

The second determining area 6324 includes a second necessity section 63241, a second contribution section 63242, and a second result section 63243 ("result 2" column). The second necessity section 63241 stores necessity determined in the same manner as the first determining area 6323 for the reading units A to F and the reading unit H. In the case of FIG. 4, since the symbol BK of the article "d" has been read by only the reading unit H, the second necessity section 63241 stores a necessity value of "1" for the reading unit H. Since all of the symbols BK of the other commodities have been read by two or more reading units, the second necessity section 63241 stores necessity "0". The reading unit G has already been excluded from further consideration.

When the control unit 600 calculates contributions values for the second contribution section 63242 for each of the reading units A to F, in the same manner as discussed above for the first contribution value, but now excluding both the reading unit H and the reading unit G. That is, the calculated second contribution values are as follows: reading unit A (0.42), reading unit B (0.36), reading unit C (0.31), reading unit D (0.29), reading unit E (0.31), and reading unit F (0.33). The contribution values that have been calculated by the control unit 600 are stored in the second contribution section 63242. The control unit 600 identifies the reading unit D as having the lowest contribution value. Thus, in the second result section 63243, a value of "1" is stored for the reading unit H, (because the necessity of reading unit H is set to "1") and also the reading units A to C, the reading unit E, and the reading unit F, which indicates these reading units are to operate in the full operation state. On the other hand, in the second result section 63243, a value of "0" is stored for the reading unit D, which indicates this reading unit can be switched to the standby state.

Figure 5:
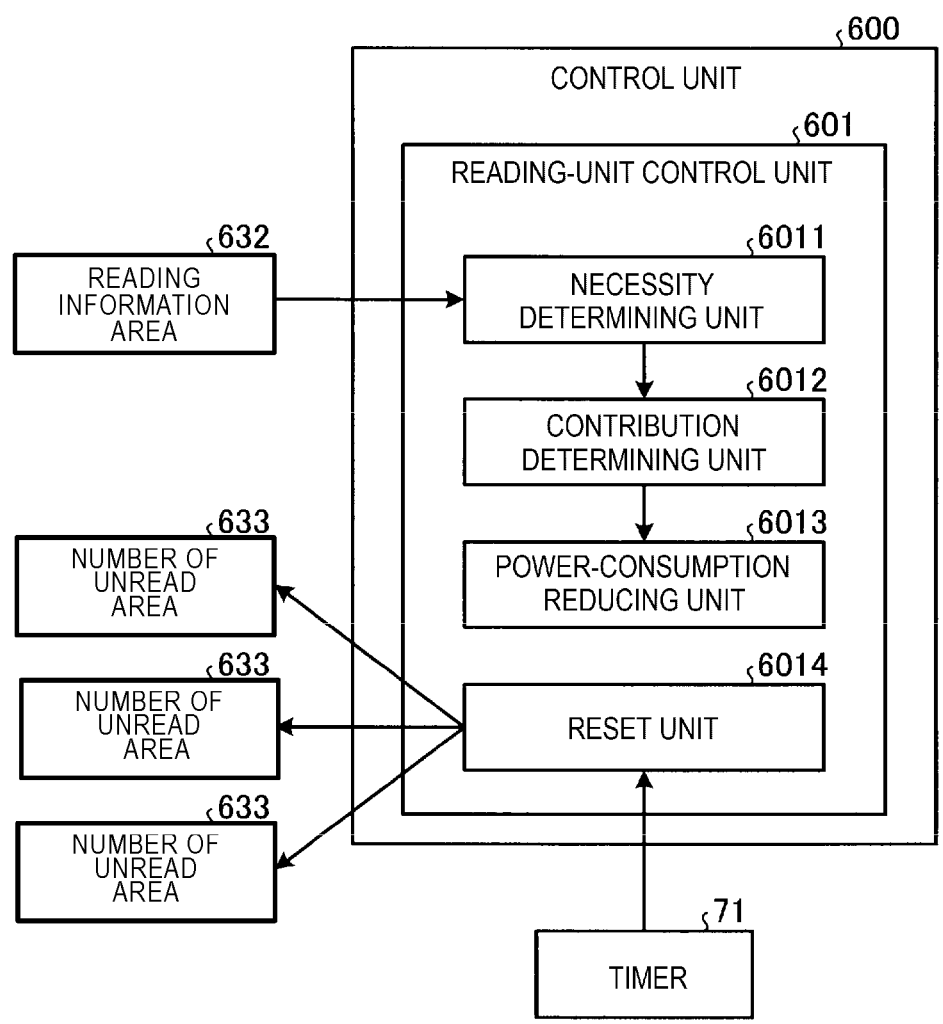
FIG. 5 is a functional block diagram of a symbol reading device according to an embodiment.

A functional configuration of the symbol reading device 6 is explained. FIG. 5 is a functional block diagram of the symbol reading device 6. As illustrated in FIG. 5, the symbol reading device 6 functions as a reading-unit control unit 601 by executing a control program stored in the ROM 62 and the control program area 641 and loaded in the RAM 63.

The reading-unit control unit 601 switches one or more reading units among the plurality of reading units A to H providing a low contribution to the reading of the symbols BK, which are attached to the articles M conveyed along the article conveyance path, from the full operation state to the standby state in which power consumption is reduced.

In an embodiment, the reading-unit control unit 601 functions as a necessity determining unit 6011, a contribution determining unit 6012, a power-consumption reducing unit 6013, and a reset unit 6014.

The necessity determining unit 6011 identifies those reading units which appear to be necessary reading units. Specifically, the necessity determining unit 6011 determines, based on information concerning necessity stored in the reading information area 632, the always necessary reading units. More specifically, the necessity determining unit 6011 stores, in the first necessity section 63231, a value of "1" for any necessary reading units and a value of "0" for unnecessary reading units. Further, the necessity determining unit 6011 stores, in the second necessity section 63241, a value of "1" for the necessary reading units and "0" for unnecessary reading units.

The contribution determining unit 6012 determines one or more reading units providing a low contribution value. Specifically, the contribution determining unit 6012 calculates contribution values for the reading units using, for example, the calculation method explained above and then identifies determines one or more reading units providing a low contribution to successful symbol readings. More specifically, the contribution determining unit 6012 stores the calculated contribution values for each of the available, yet not deemed as necessary, reading units in the first contribution section 63233. The contribution determining unit 6012 stores, in the first result section 63234, 0 value indicating that the reading unit should be switched from the full operation state to the standby state for the reading unit having the lowest determined contribution. The contribution determining unit 6012 stores, in the first result section 63234, "1" value indicating that the reading units should be operated in the full operation state for the reading units other than the reading unit having the lowest determined contribution.

When there was an article M, the symbol BK of which was successfully read by only a single reading unit (which is thus deemed a necessary reading unit), among a conveyed plurality of articles M, the contribution determining unit 6012 determines contribution values only for those reading units other than the identified/deemed necessary reading unit (e.g., as depicted in FIG. 4, reading unit H is identified as necessary since only reading unit H read the symbol BK from article "d". Specifically, the contribution determining unit 6012 determines contributions in the other reading units excluding the necessary reading unit(s).

The power-consumption reducing unit 6013 switches one or more reading units providing a low contribution from the full operation state to the power consumption reduced state. Specifically, the power-consumption reducing unit 6013 switches those reading units determined by the contribution determining unit 6012 as providing a low contribution from the full operation state to the power consumption reduced state (also referred to as a standby state). More specifically, the power-consumption reducing unit 6013 switches reading units for which "0" is stored in the first result section 63234 from the full operation state to the power consumption reduced state.

The contribution determining unit 6012 again determines one or more reading units providing a low contribution from among the remaining ones of the reading units. Specifically, the contribution determining unit 6012 stores the calculated contributions for each of the other reading units in the second contribution section 63242. The contribution determining unit 6012 stores, in the second result section 63243 for the reading unit having the lowest contribution, a "0" value indicating that the reading unit is to be switched from the full operation state to the standby state. The contribution determining unit 6012 stores, in the second result section 63243 for the other reading units, a "1" value indicating that these reading units are to be in the full operation state.

The power-consumption reducing unit 6013 switches one or more reading units from the full operation state to the power consumption reduced state. Specifically, the power-consumption reducing unit 6013 switches the reading units determined as having low contribution in the second contribution calculations from the full operation state to the power consumption reduced state. More specifically, the power-consumption reducing unit 6013 switches the reading units for which "0" is stored in the second result section 63243 from the full operation state to the power consumption reduced state.

If some predetermined condition is satisfied, the reset unit 6014 switches the power consumption of those reading units in the power consumption reduced state back to the full operation state. For example, if the number of reading failures of an article M reaches a predetermined number (for example, two failures) (that is, the predetermined condition is satisfied by two failures in reading an article M), the reset unit 6014 switches the reading units in the standby state to operate in the full operation state. The reset unit 6014 may, for example, switch the reading units in the standby state to the full operation state at a predetermined time each day (for example, midnight) or after some set period of time elapses. The reset unit 6014 clears all of the information stored in the reading information area 632, the number of unread (failed readings) stored in the number-of-unread areas 633, and the information concerning the reading units in the standby state stored in the standby information area 634.

Figure 6:
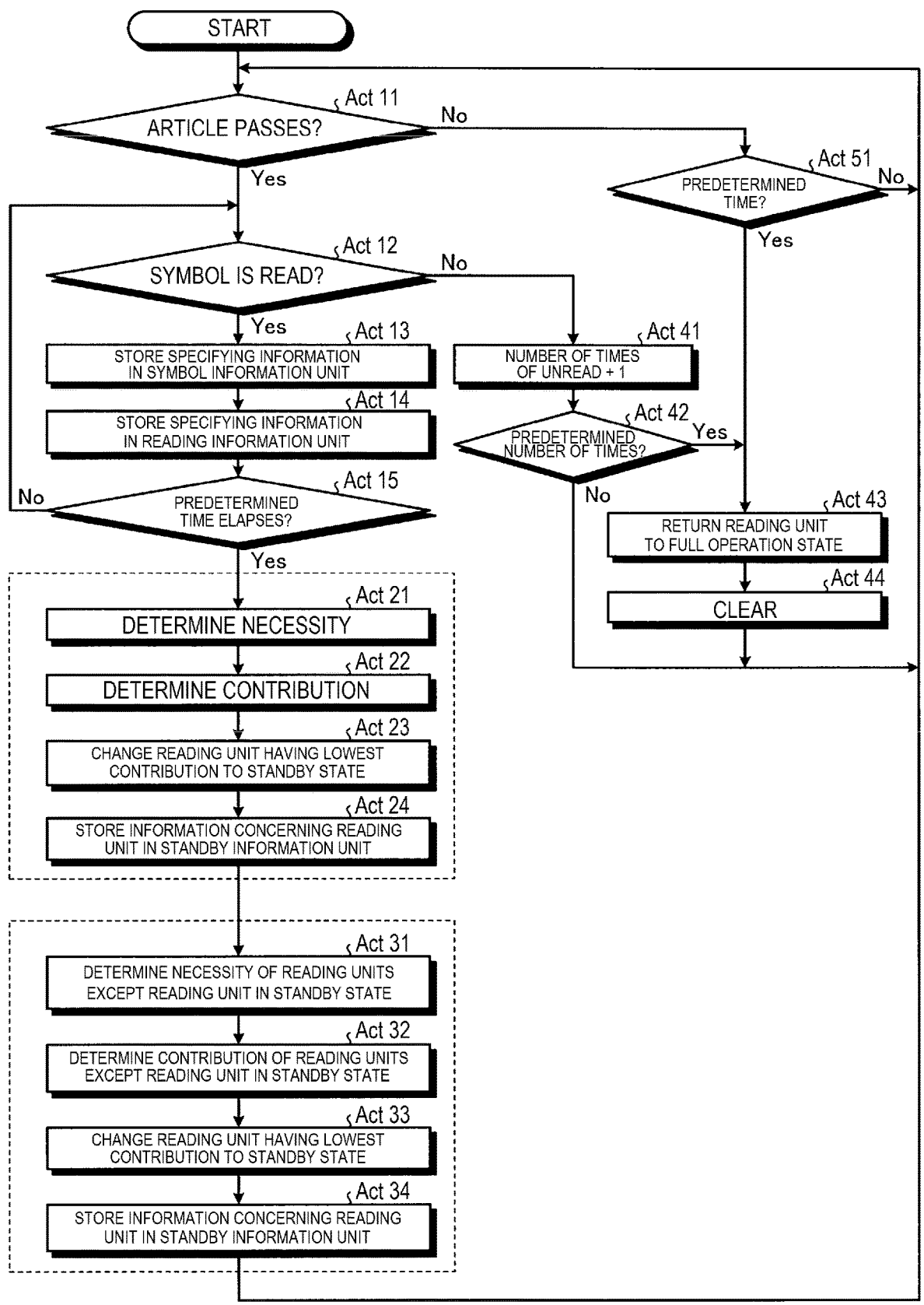
FIG. 6 is a flowchart of control processing of a symbol reading device according to an embodiment.

Control of the symbol reading device 6 is explained. FIG. 6 is a flowchart of control processing of the symbol reading device 6. As illustrated in FIG. 6, the control unit 600 of the symbol reading device 6 determines whether an article M has passed through the symbol reading device 6 (Act 11). If the article sensor 67 provided in the substantially center part 16 has detected the article M, the control unit 600 determines that the article M has passed through the symbol reading device 6. If determining that the article M has passed through the symbol reading device 6 (Yes in Act 11), subsequently, the control unit 600 determines whether any one or more reading units of the reading units A to H have read the symbols BK attached to the article M (Act 12). If determining that the one or more reading units have read the symbols BK attached to the article M (Yes in Act 12), the control unit 600 acquires specifying information related to the read symbols BK and stores the specifying information in the symbol information area 631 (Act 13). The control unit 600 stores the specifying information in the reading information area 632 (Act 14). Specifically, the control unit 600 stores, concerning the article M, in the reading result area 6322, the acquired specifying information in association with the reading units that have read the symbols BK.

Subsequently, the control unit 600 determines whether a predetermined time has elapsed from the reading of the symbols BK (Act 15). The predetermined time is a time period (for example, 2 to 3 seconds) necessary for the reading units A to H to read the symbols BK attached to the article M passing through the symbol reading device 6. If determining that the predetermined time has not elapsed (No in Act 15), the control unit 600 returns to Act 12 and repeats the processing in Act 12 to Act 15.

If determining that the predetermined time has elapsed (Yes in Act 15), the necessity determining unit 6011 determines whether there is a necessary reading unit that is the only one reading unit that has read the symbol BK concerning the article M (Act 21). If determining that there is such a necessary reading unit, the necessity determining unit 6011 stores "1" in the first necessity section 63231 associated with the necessary reading unit (Act 21).

Subsequently, the contribution determining unit 6012 determines respective contributions concerning all reading units excluding the reading unit that has been determined to be necessary by the necessity determining unit 6011 (Act 22). Specifically, the contribution determining unit 6012 calculates contributions of the reading units based on the calculation method explained above and stores the contributions in the first contribution section 63233. The contribution determining unit 6012 stores "0" in the result 1 section 63234 corresponding to the reading unit having the lowest contribution and stores "1" in the result 1 section 63234 corresponding to the other reading units. The contribution determining unit 6012 stores "1" in the result 1 section 63234 corresponding to the reading unit that has been determined to be necessary by the necessity determining unit 6011.

Subsequently, the power-consumption reducing unit 6013 switches the state of the reading unit having the low contribution from the full operation state to the power consumption reduced state (Act 23). Specifically, the power-consumption reducing unit 6013 switches the state of the reading unit, which has been determined to have the lowest contribution by the contribution determining unit 6012 and for which "0" is stored in the result 1 section 63234, from the full operation state to the standby state in which power consumption is smaller. The control unit 600 stores information concerning the reading unit to be switched to the standby state in the standby information area 634 (Act 24). In this way, the control unit 600 switches the state of one reading unit to the standby state according to the processing in Act 21 to Act 24.

Subsequently, the necessity determining unit 6011 determines whether there is a necessary reading unit that is the only reading unit that has read the symbol BK concerning the article M except the reading unit that has been switched to the standby state in the processing in Act 23 (Act 31). If determining that there is such a necessary reading unit, in Act 31, the necessity determining unit 6011 stores "1" in the second necessity section 63241 associated with the necessary reading unit.

Subsequently, the contribution determining unit 6012 determines respective contributions concerning all the reading units excluding the reading unit that has been switched to the standby state in the processing in Act 23 and the reading unit that has been determined to be necessary in Act 31 by the necessity determining unit 6011 (Act 32). Specifically, the contribution determining unit 6012 calculates contributions of the reading units based on the calculation method explained above and stores the contributions in the second contribution section 63242. The contribution determining unit 6012 stores "0" in the result 2 section 63243 corresponding to the reading unit having the lowest contribution and stores "1" in the result 2 section 63243 corresponding to the other reading units. The contribution determining unit 6012 stores "1" in the result 2 section 63243 corresponding to the reading unit that has been determined to be necessary by the necessity determining unit 6011 in Act 31.

Subsequently, the power-consumption reducing unit 6013 switches the state of the reading unit having the lowest contribution from the full operation state to the power consumption reduced state (Act 33). Specifically, the power-consumption reducing unit 6013 switches the state of the reading unit, which has been determined to have the lowest contribution by the contribution determining unit 6012 in the processing in Act 32 and for which "0" is stored in the result 2 section 63243, from the full operation state to the standby state. The control unit 600 stores information concerning the reading unit to be switched to the standby state in the standby information area 634 (Act 34). The control unit 600 returns to Act 11.

On the other hand, if determining in Act 12 that none of the reading unit has successfully read the symbols BK (No in Act 12), the control unit 600 increments the number of unread (failed readings) stored in the number-of-unread area 633 by one (Act 41). Subsequently, the control unit 600 determines whether the number of unread stored in the area 633 has reached a predetermined number (Act 42). If the number of unread reaches the predetermined number (Yes in Act 42), the reset unit 6014 returns the reading units in the standby state to the full operation state based on the information stored in the standby information area 634 (Act 43). The reset unit 6014 clears all of the information stored in the reading information area 632, the number of unread stored in the number-of-unread area 633, and the information stored in the standby information area 634 (Act 44). The control unit 600 returns to Act 11.

If determining in Act 11 that the article M has not passed through the symbol reading device 6 (No in Act 11), the control unit 600 determines whether a predetermine time has arrived (Act 51). If determining that the predetermined time has come (Yes in Act 51), the reset unit 6014 executes the processing in Act 43 and the processing in Act 44. The control unit 600 returns to Act 11. If determining that the predetermined time has not come (No in Act 51), the control unit 600 returns to Act 11.

According to the aforementioned embodiments, the symbol reading device 6 includes a plurality of reading units that read the symbols BK attached to the articles M conveyed along the conveyance path, and the reading-unit control unit 601 that switches the states of two reading units providing the low contributions related to the successful reading of the symbols from the full operation state to the standby state. Such a symbol reading unit 6 can switch the reading unit(s) providing a low contribution to the standby state in which power consumption is reduced. Accordingly, the symbol reading device 6 is capable of reducing power consumption of the reading units and read the symbols BK.

In the aforementioned embodiments, the standby state is used as an example of the power consumption reduced state in which power consumption is smaller than power consumption in the full operation state. However, the power consumption reduced state may be a state in which the frequency of reading attempts by the reading unit is reduced from the full operation state frequency. If the reading unit is in such a reading reduced state, since the number of symbol BK reading attempts is reduced, the power consumption of the reading unit is less than power consumption in the full operation state. When a reading unit is reading frequency reduced state, the probability of reading a symbol BK decreases but such a reading unit can still read a symbol BK on occasion.

The method for calculating contributions explained in the embodiments is only an example. Any other calculation method may be used to acquire relative contribution values for the reading units.

In the example explained in the embodiments, the belt conveyor 1 is used to convey the article M in a warehouse. However, the belt conveyor 1 may be, for example, used to convey commodities to be purchased by a customer at a checkout counter in a retail store. Furthermore, a conveyor that conveys the article M by means other than a belt may be used instead of the belt conveyor 1.

In the aforementioned embodiments, the reading-unit control unit 601 identifies the contributions of the reading units in the two stages and switches the state of the reading unit having the lowest contribution to the standby state after each stage. However, the reading-unit control unit 601 may in some examples switch, after the first determination, the states of two reading units to the standby state as identified by an ascending order of the contributions of the reading units.

In the aforementioned embodiments, the two reading units are set to the standby state. However, in some examples, only one reading unit or three or more reading units may be set to the standby state.

In the aforementioned embodiments, the reading units are disposed along the arch of the housing of the supporting unit 17 provided in the substantially center part 16. However, the reading units may be disposed in any location as long as the reading units can read the symbols BK attached to the articles M being conveyed by the conveyor belt 13.

In the aforementioned embodiments, the predetermined condition is satisfied when the number of failures in reading reaches a predetermined number or a predetermined time arrives. However, any other condition may be adopted, e.g., a particular operation is input to the symbol reading device 6 or the symbol reading device 6 is initialized at startup or restart.

The programs executed by the symbol reading device 6 may be provided via a computer-readable recording medium such as a CD-ROM, a flexible disk (FD), a CD-R, or a DVD (Digital Versatile Disc) as an installable format or executable format file.

The programs executed by the symbol reading device 6 may be stored on a computer connected to a network such as the Internet and may be downloaded from the computer through the network. The programs executed by the symbol reading device 6 in the embodiments may be provided or distributed through the network such as the Internet.

The programs executed by the symbol reading device 6 in the embodiments may be stored in the ROM 62 in advance.

The embodiments explained above are examples and are not intended to limit the scope of the invention. The embodiments can be implemented in other various forms. Various omissions, substitutions, and changes can be made without departing from the spirit of the invention. The embodiments and modifications to the embodiments are included in the scope and the gist of the invention and included in the inventions described in claims and the scope of equivalents of the inventions.

What is claimed is:

1. A symbol reading device, comprising: a plurality of reading units configured to read symbols on articles being conveyed along a conveyance path; and a processor configured to: acquire symbol information by controlling the plurality of reading units to read symbols on each article and store the symbol information in association with each of the reading units in the plurality that respectively has read the symbols on each of the articles, identify a first reading unit in the plurality that can be substituted by another reading unit in the plurality based on a low contribution to successful symbol reading according to the symbol information associated with each of the reading units, and control the first reading unit to enter into a power saving state;
characterized in that the processor is further configured to control the first reading unit to return to a normal power state from the power saving state when no symbol has been read by any reading unit for a predetermined time period.

2. The symbol reading device according to claim 1, wherein the processor identifies the first reading unit by calculating a contribution value based on the symbol information associated with each of the reading units.

3. The symbol reading device according to claim 1, wherein the reading units in plurality of reading units are cameras.

4. The symbol reading device according to claim 1, wherein the reading units in the plurality of reading units are optical scanners.

5. The symbol reading device according to claim 1, wherein the processor is further configured to: identify a second reading unit to enter into the power saving state by calculating a contribution value excluding the first reading unit.

6. The symbol reading device according to claim 1, wherein the predetermined condition is satisfied when a predetermined time of day arrives.

7. The symbol reading device according to claim 1, further comprising: an arch-shaped body on which the plurality of reading units is attached.

8. The symbol reading device according to claim 7, wherein the conveyance path passes through the arch-shaped body.

9. A symbol reading method, comprising: acquiring symbol information, with a plurality of reading units, by reading symbols on each article conveyed along a conveyance path and storing the symbol information in association with each of the reading units in the plurality that respectively read the symbols on each of the articles; identifying a first reading unit in the plurality that can be substituted by another reading unit in the plurality based on a low contribution to successful symbol reading according to the symbol information associated with each of the reading units; and controlling the first reading unit to enter into a power saving state;
characterized by further comprising controlling the first reading unit to return to a normal power state from the power saving state when no symbol has been read by any reading unit for a predetermined time period.

10. The symbol reading method according to claim 9, wherein the first reading unit is identified by calculating a contribution value based on the symbol information associated with each of the reading units.

11. The symbol reading method according to claim 9, wherein the reading units in plurality of reading units are cameras.

12. The symbol reading method according to claim 9, wherein reading units in the plurality of reading units are optical scanners.

13. The symbol reading method according to claim 9, further comprising: identifying a second reading unit in the plurality to enter into the power saving state by calculating a contribution value excluding the first reading unit; and controlling the second reading unit to enter into the power saving state.

14. The symbol reading method according to claim 9, wherein the predetermined condition is satisfied when a predetermined time of day arrives.

15. A symbol reading system, comprising: a conveyer on which articles are conveyed; and a symbol reading device including: a plurality of reading units configured to read symbols on articles being conveyed by the conveyor; and a processor configured to: acquire symbol information by controlling the plurality of reading units to read symbols on each article conveyed by the conveyor and store the symbol information in association with each of the reading units that respectively read the corresponding symbols on each article, identify a first reading unit in the plurality of reading units that can be substituted by another reading unit in the plurality based on a low contribution to successful symbol reading according to the symbol information associated with each of the reading units, and control the first reading unit to enter into a power saving state;

characterized by further comprising controlling the first reading unit to return to a normal power state from the power saving state when no symbol has been read by any reading unit for a predetermined time period.

16. The symbol reading system according to claim 15, wherein the symbol reading device has an arch-shaped body on which the plurality of reading units is attached, and the conveyer conveys articles through the arch-shaped body.

* * * * *